United States Patent [19]

Belden

[11] Patent Number: 5,423,984
[45] Date of Patent: Jun. 13, 1995

[54] FLUID FILTER

[75] Inventor: Donald E. Belden, Sand Springs, Okla.

[73] Assignee: Facet International, Inc., Tulsa, Okla.

[21] Appl. No.: 58,768

[22] Filed: Apr. 13, 1993

[51] Int. Cl.6 .............................................. B01D 27/06
[52] U.S. Cl. ...................... 210/232; 210/437; 210/493.1; 210/493.5
[58] Field of Search .............. 210/232, 323.2, 345, 210/497.1, 437, 493.1, 493.5

[56] References Cited

U.S. PATENT DOCUMENTS

| | | | |
|---|---|---|---|
| 2,598,210 | 5/1952 | Beacham | 210/493.1 |
| 2,788,128 | 4/1957 | Heine | 210/282 |
| 3,154,487 | 10/1964 | Thornton et al. | 210/323 |
| 3,300,050 | 1/1967 | Perry | 210/234 |
| 3,334,747 | 8/1967 | Niccum et al. | 210/130 |
| 3,476,249 | 11/1969 | Gray et al. | 210/493.1 |
| 3,515,210 | 6/1970 | Perkins | 166/205 |
| 3,524,548 | 8/1970 | McDonald et al. | 210/323.2 |
| 3,647,083 | 3/1972 | Niccum et al. | 210/437 |
| 3,680,706 | 8/1972 | Baer et al. | 210/345 |
| 3,747,765 | 7/1973 | Nowak | 210/510.1 |
| 3,819,052 | 6/1974 | Firth | 210/90 |
| 4,017,397 | 4/1977 | Copeland | 210/238 |
| 4,061,576 | 12/1977 | Hilgert et al. | 210/437 |
| 4,498,989 | 2/1985 | Miyakawa et al. | 210/493.5 |
| 4,540,489 | 9/1985 | Barnard | 210/287 |
| 4,810,379 | 3/1989 | Barrington | 210/493.1 |
| 4,819,722 | 4/1989 | Daly | 210/497.1 |
| 4,959,141 | 9/1990 | Anderson | 210/109 |
| 5,045,192 | 9/1991 | Terhune | 210/232 |
| 5,112,478 | 5/1992 | Mohr | 210/96.1 |
| 5,178,753 | 1/1993 | Trabold | 210/437 |
| 5,190,161 | 3/1993 | Arai | 210/497.1 |
| 5,192,430 | 3/1993 | Mohr | 210/172 |
| 5,207,856 | 5/1993 | May | 210/497.1 |
| 5,211,846 | 5/1993 | Kott et al. | 210/493.5 |

FOREIGN PATENT DOCUMENTS

| 0714668 | 9/1954 | United Kingdom | 210/493.1 |
|---|---|---|---|
| 1284404 | 8/1972 | United Kingdom | 210/493.1 |

Primary Examiner—Virginia Manoharan
Attorney, Agent, or Firm—Head & Johnson

[57] ABSTRACT

An improved fluid filter is provided that has a rigid apertured center tube which is attached to a fluid outlet. Once the center tube assembly is secured to the fluid outlet, a tubular filter element is replaceably secured around the center tube. By incorporating a rigid center tube, the tubular filter element can be constructed so that it does not require a self contained supporting structure. Thus, by eliminating an integral supporting structure, the filter element can be made solely of combustable materials, aiding in the disposal of used filter elements.

6 Claims, 3 Drawing Sheets

FLUID FILTER

BACKGROUND OF THE INVENTION

1. Field of the Invention

The present invention relates to a filter system designed to accommodate a filter element having no center supporting tube. This allows a filter element to be constructed solely of combustible material, thus allowing the filter element to be completely incinerable.

2. Description of the Related Art

In industrial filtering applications, often the material which is to be filtered contains contaminants which must be removed and disposed of as hazardous waste. One of the acceptable ways of disposing of many types of hazardous waste is incineration performed by a licensed hazardous waste disposal facility.

One problem which previous filter systems present is that the filter element onto which the contaminates adhere have generally contained a metal or other rigid, non-combustible center support member. In order to incinerate these filter elements, the support member must either be manually removed from the filter element prior to the incineration and then separately disposed of as hazardous waste or, alternately, the entire filter element must be shredded prior to incineration.

Removal of the center support member prior to incineration presents safety problems to the workers performing the removal, adds to the cost of disposal, and increases the risk of liability to the company generating the waste. This increase in risk of liability is due to the fact that the removed support members are considered hazardous waste which must be disposed of in a licensed hazardous waste landfill. As a contributor to a hazardous waste landfill which may sometime be declared a Superfund site, the generating company, the disposal company and any transporting company which was employed to deliver the support members to the landfill, may all face future liability for the disposal. Thus, both the generating company and the disposal company would prefer to avoid this option since under current hazardous disposable waste laws, they remain liable for their hazardous waste from "cradle-to-grave".

On the other hand, in order for the entire filter element to be incinerated, a disposal facility must first be located which has the capability of shredding materials prior to incineration. Second, since the non-combustible elements of the filter element will pass through the hazardous waste incinerator and will exit as solid waste which is normally disposed of as hazardous waste in a hazardous waste landfill, the generating company retains the potential Superfund liability with this option also. This is true despite the fact that the material is not hazardous waste, since all contributors to a landfill which later becomes a Superfund site are liable for ensuing cleanup costs regardless of the types of materials they contributed. For these reasons, shredding and incinerating the entire filter elements is also an unattractive option.

The only other viable option available for disposal of most filter elements is to bury the entire filter element in a hazardous waste landfill. This option is costly and increases the risk of Superfund liability since the containers in which the filter elements are sealed for burial will eventually be breached by the soil's natural chemical processes, thus releasing the contaminants into the soil.

Thus, to avoid potential liability, it is desirable to have completely incinerable filters. The present invention addresses this problem by providing a filter system having a permanent center tube assembly onto which fully incinerable filter elements may be replaceably attached.

SUMMARY OF THE INVENTION

The present invention briefly is a filter system having an elongated hollow apertured center tube assembly around which fully incinerable filter elements may be replaceably secured. The center tube assembly may be composed of one or more interlocking tube sections which are attached to each other end-to-end by means of an intermediate connecting member. Each of the interlocking tube sections is composed of an interlocking upper female tube and a corresponding lower male tube. A bottom end of the tube assembly abuts a filter attachment means and is held in vertical alignment therewith by means of a central rod which secures to the filter attachment means and extends upwardly therefrom, passing sequentially through openings provided in a bottom flange member located at the bottom end of the center tube assembly, a hub portion provided on each intermediate connecting member for center tube assemblies comprised of more than one interlocking tube section, and a top flange member located at a top end of the center tube assembly. A jam nut tightens onto a threaded portion provided on a top end of the rod, abutting the top flange member in order to secure the center tube assembly to the filter attachment means. The filter element is then slid down around the center tube assembly. A yoke provided with a central opening through which the threaded portion of the rod passes, is secured to the filter system by tightening a nut onto the threaded portion of the rod so that the nut tightens against washers which abut the yoke. As the nut is tightened, a compressible bottom sealing gasket provided on a bottom end of the filter element seals the filter element to the filter attachment means and a compressible top sealing gasket provided on a top end of the filter element seals the filter element to the yoke.

In use, a medium to be filtered passes inwardly through a pleated filter medium provided on the filter element, through the apertured centered tube assembly, then downwardly through the opening in the bottom flange member which communicates with a fluid passageway provided in the filter attachment means as a means for the filtered medium to exit the filter system.

DETAILED DESCRIPTION OF THE PREFERRED EMBODIMENTS

Figure 1:
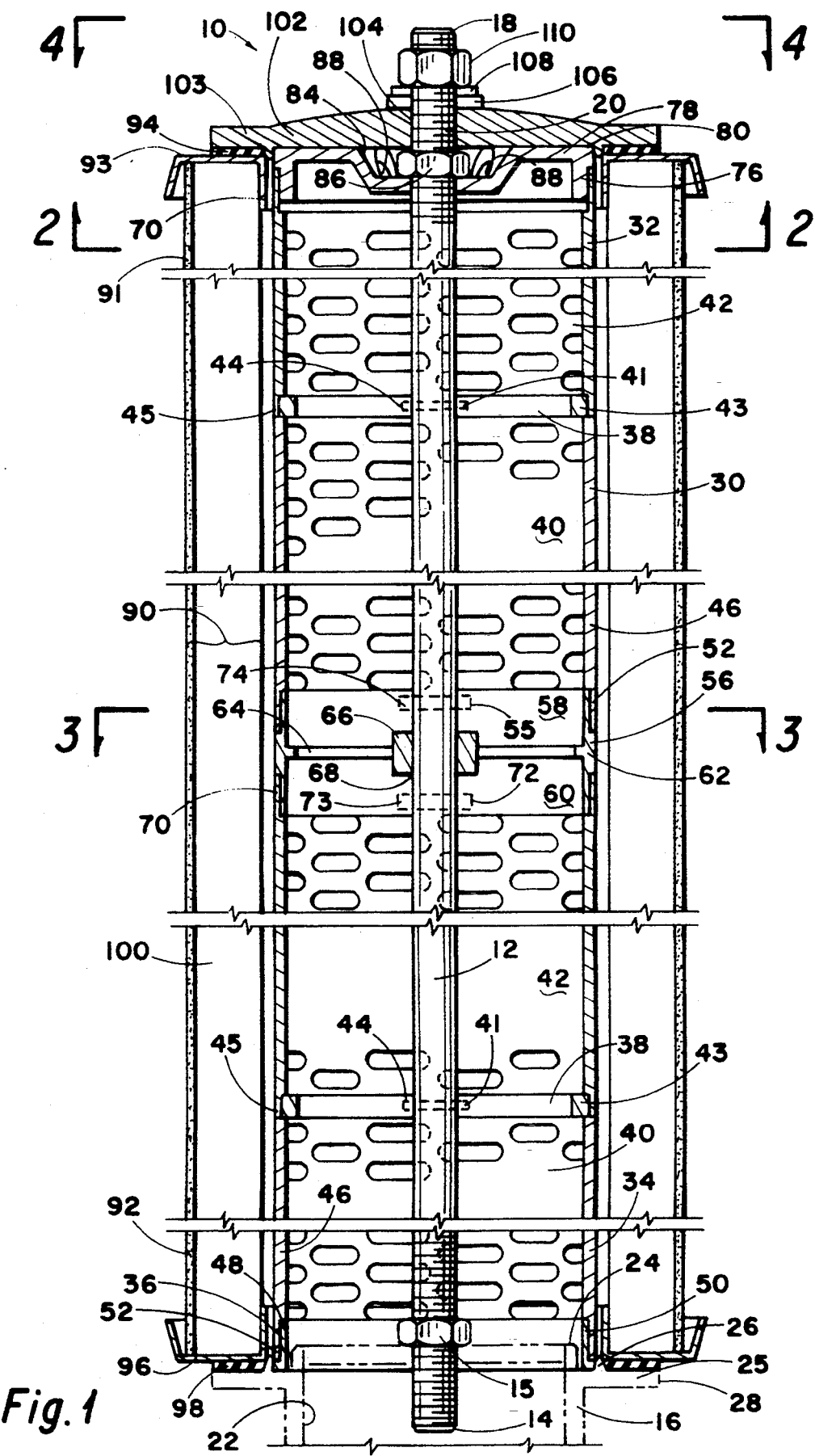
FIG. 1 is a front elevation of a filter system constructed according to a preferred embodiment of the present invention.

Referring now to the drawings and initially to FIG. 1, there is illustrated a filter system 10 constructed according to a preferred embodiment of the present invention.

The filter system 10 is provided with a vertically oriented central rod 12, having a bottom end 14, which is attached by means of a nut 15 or otherwise to a filter attachment means 16, and a top end 18 provided with a threaded portion 20. The filter attachment means 16 is provided with a fluid passageway 22 therethrough. An upwardly oriented inner retaining lip 24 is provided concentrically around the fluid passageway 22. The filter attachment means 16 is provided with a horizontally oriented ledge 25 attached circumferentially and extending outwardly from the inner retaining lip 24. An upwardly oriented outer retaining lip 26 is provided on the ledge 25 of the filter attachment means 16 so that the outer retaining lip is spaced away from the inner retaining lip 24 and is spaced away from an outer edge 28 of the ledge 25.

An elongated apertured center tube assembly 30, having a top end portion 32 and a bottom end portion 34, attaches by means of a bottom flange member 36 provided on the bottom end portion 34 of the center tube assembly 30 to the filter attachment means 16 so that the center tube lower end rests between the inner and outer retaining lips 24 and 26. Bottom flange member 36 is provided with a central opening which allows communication between the center tube assembly 30 and the fluid passageway 22 of the filter attachment means 16.

The center tube assembly 30 is composed of at least one interlocking tube section 38. The filter system 10, as illustrated in FIG. 1, employs two interlocking tube sections 38. Although not illustrated, the present invention also includes filter systems 10 employing one or more than two interlocking tube sections 38. Each interlocking tube section 38 is composed of a lower male tube 40 and an upper female tube 42. The tubes 40 and 42 are held together by means of ears 41 provided on an upper end 43 of each of the lower male tubes 40 that engage corresponding openings 44 provided in a lower end 45 of each of the female tubes 42.

Figure 6:
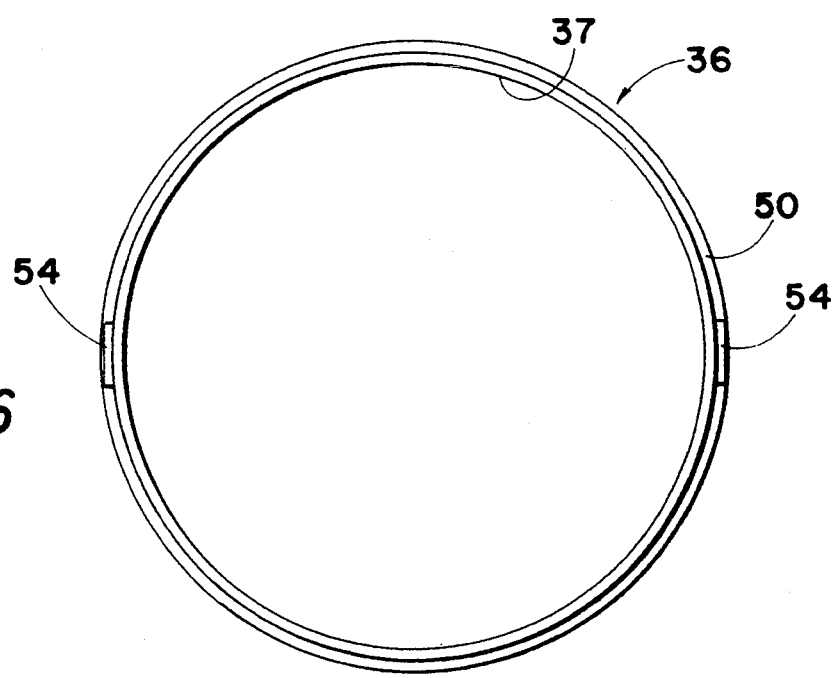
FIG. 6 is a top plan view of the bottom flange taken along line 6—6 of FIG. 5.
Figure 5:
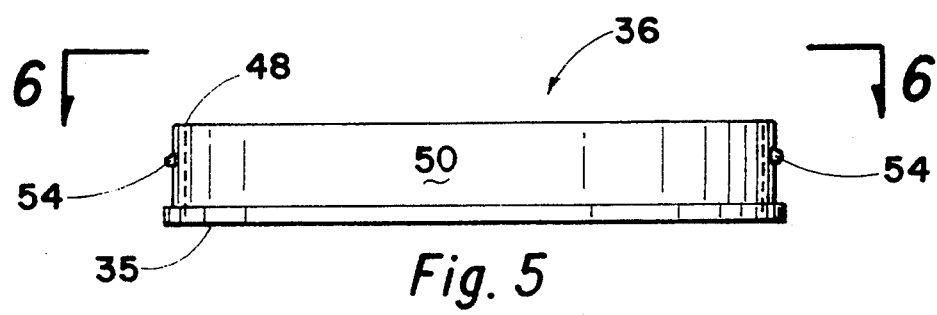
FIG. 5 is a front elevation of a bottom flange removed from the filter system of FIG. 1.

Each of the male tubes 40 is provided with a lower end 46. When the center tube assembly 30 is composed of only one tube section 38, the lower end 46 of the solitary male tube 40 serves as the bottom end 34 of the center tube assembly 30 and, as such, secures to an upper end 48 of the bottom flange member 36. As best seen in FIGS. 1, 5 and 6, the upper end 48 of bottom flange member 36 is provided with an upwardly oriented section 50 of decreased external diameter, and the lower end 46 of the lower male tube 40 is provided with a downwardly oriented section 52 of increased internal diameter so that the upwardly oriented section 50 telescopically receives the downwardly oriented section 52. The upwardly oriented section 50 is provided with ears 54 that engage corresponding openings 55 (visible in the upper most tube section 38 in FIG. 1) provided in the downwardly oriented section 52 in order to secure the bottom end 34 of the central tube assembly 30 to the bottom flange member 36.

Figure 3:
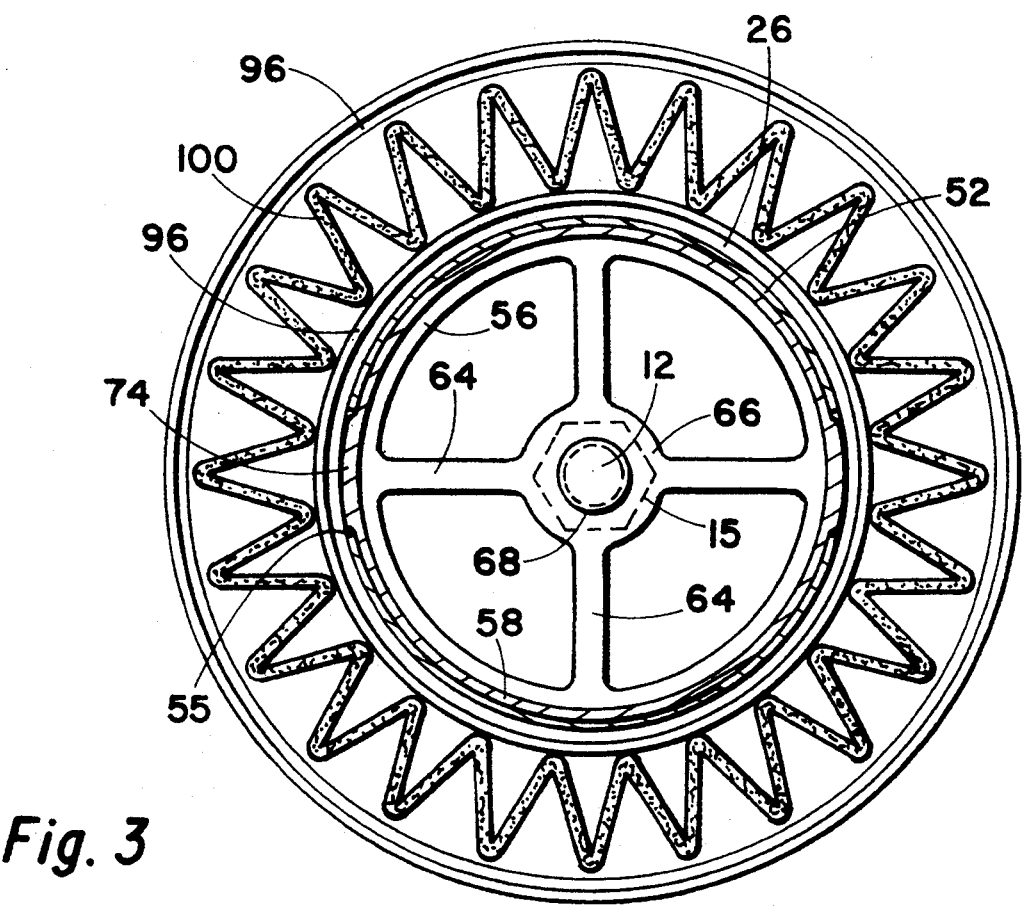
FIG. 3 is a cross-sectional view taken along line 3—3 of FIG. 1.

As illustrated in FIG. 1, two or more tube sections 38 can be attached concentrically end-to-end by employing intermediate connecting members 56. Each of the intermediate connecting members 56 has an upwardly oriented upper end 58, a downwardly oriented lower end 60, and a middle portion 62 located between the two ends 56 and 60. Collectively, the ends 56 and 60 and the middle portion 62 comprise a circumferential flange portion of each of the intermediate connecting members 56. Referring also to FIG. 3, the middle portion 62 is provided with spokes 64 oriented inwardly and attached centrally to a central hub 66. The central hub is provided with an opening 68 therethrough for receiving the rod 12.

Each of the lower ends 60 is decreased in external diameter, and an upper end 70 provided on each of the female tubes 42 is decreased in internal diameter so that the lower ends 60 are telescopically received by the upper ends 70 of the interlocking tube section 38 located immediately below. Each of the upper ends 70 is provided with openings 72 for receiving corresponding ears 73 provided on each of the lower ends 60 to secure the intermediate connecting member 56 to the tube section 38 located immediately below the intermediate connecting member 56.

Likewise, each of the upper ends 56 is decreased in external diameter so that the upper ends 56 telescopically receive the downwardly oriented sections 52 provided on the lower ends 46 of the male tube 40 in the tube section 38 located immediately above. Similarly, each of the upper ends 58 is provided with ears 74 that engage the openings 55 provided in the downwardly oriented section 52 of the male tube 40 of the tube section 38 located immediately above in order to secure together the intermediate connecting member 56 and the tube section 38 immediately above.

The upper end 70 of the female tube 42 located in the upper most tube section 38 of the filter system 10 is telescopically received by a lower end 76 having a reduced external diameter which is provided on a top flange member 78. The top flange member 78 is removably secured to the center tube assembly 30 and, therefore, the top flange member 78 does not have any ears for engaging the openings 72 provided on the upper end 70 of the female tube 42 in the uppermost tube section 38.

Figure 2:
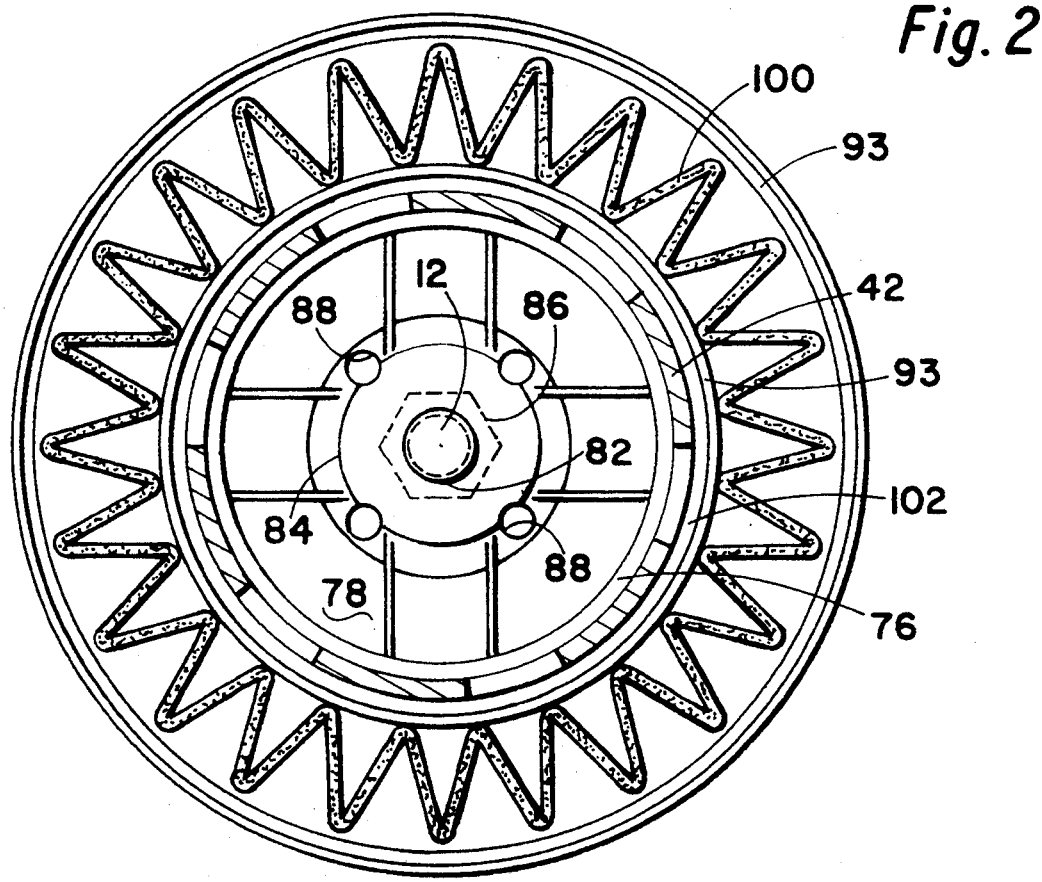
FIG. 2 is a cross-sectional view taken along line 2—2 of FIG. 1.

The top flange member 78, shown in FIGS. 1 and 2, is provided with a continuous upper end 80 that extends inwardly and is provided with a central opening 82 therethrough for receiving the rod 12. Adjacent the central opening 82, the upper end 80 of flange member 78 forms an upwardly facing depression 84 into which a jam nut 86 is positioned when the jam nut 86 is tightened onto the threaded portion 20 of the rod 12 in order to secure the center tube assembly 30 to the filter attachment means 16.

The upwardly facing depression 84 is provided with a plurality of pressure relief openings 88 that communicate through the top flange member 78 and that permit liquids and gases from becoming trapped in the depression 84.

Once the center tube assembly 30 has been secured to the filter attachment means 16, a hollow pleated filter element 90, having a top end 91 and a bottom end 92, is lowered around the center tube assembly 30. The pleated filter element 90 comprises a top ring 93 to which a top sealing gasket 94 is attached, an opposite bottom ring 96 to which a bottom sealing gasket 98 is attached, and a pleated filter medium 100 extending between and sealing to the top and bottom rings 93 and 96. When used with the filter system 10 which has the center tube assembly 30 attached thereto, the filter element 90 does not require a center support tube to be incorporated in the filter element 90. Therefore, the filter element 90 can be made solely of combustible materials that can be disposed of by incinerating.

Figure 4:
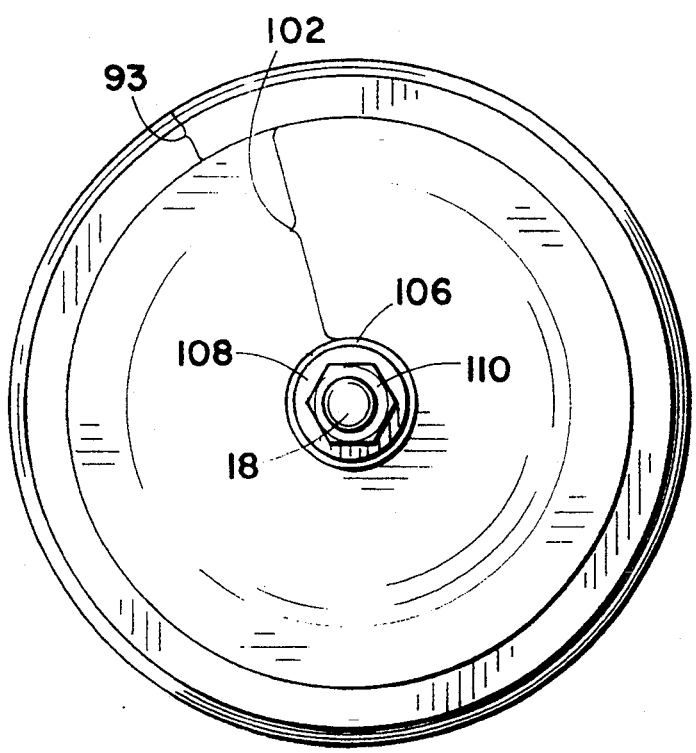
FIG. 4 is a top plan view of the filter system taken along line 4—4 of FIG. 1.

Referring now to FIGS. 1 and 4, the filter element 90 is lowered into place so that the bottom sealing gasket 98 engages the ledge 25 of the filter attachment means 16. Once the filter element 90 is in place, a yoke 102 provided with a central opening 104 therethrough is placed over the top end 18 of the rod 12 so that the rod 12 extends through the opening 104. The yoke 102 is then lowered on the rod 12 until its outer peripheral area 103 is adjacent the top flange member 78 and engages the top sealing gasket 94. A compressible washer 106 is next placed onto the threaded portion 20 adjacent the yoke 102. A second washer 108 is then placed between the compressible washer 106 and a nut 110. The nut 110 is tightened against the washers 106 and 108, thus compressing the top and bottom sealing gaskets 94 and 98 and, thereby, sealing the filter element 90 to the filter attachment means 16 on the bottom end 92 and to the yoke 102 on the top end 91.

In use, a medium to be filtered (not illustrated) passes through the pleated filter element 90, then through the apertured center tube assembly 30 before exiting the filter assembly 10 via the fluid passageway 22 of the filter attachment means 16. The center tube assembly 30 supports the filter element 90, enabling it to withstand differential pressure exerted on it by the medium to be filtered (not illustrated).

When the filter element 90 becomes clogged, flow of the medium to be filtered (not shown) is discontinued in order to take the filter system 10 out of service. After the filter system 10 is out of service, the nut 110 is removed from the rod 12 and the washers 106 and 108 and the yoke 102 are removed. The filter element 90 is then slipped upward and removed from the center tube assembly 30. A fresh filter element 90 is then inserted around the center tube assembly 30 and the yoke 102, the washers 106 and 108 are replaced, and the nut 110 is re-tightened to seal the filter element 90 to the filter attachment means 16 and the yoke 102. The filter system 10 is then ready to be placed back in service.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved fluid filter comprising:
an elongated rigid apertured center tube having a top and a bottom end;
an elongated rod extending coaxially through said center tube and having a top and a bottom end, the bottom end of the rod being secured to a filter attachment means having a fluid passageway therethrough, a portion of said rod at said top end being threaded;
a top flange member having a central opening therethrough and a periphery in engagement with and closing said center tube top end the top flange member central opening receiving said rod therethrough;
a means received on said rod adjacent to said top end thereof to thereby secure said top flange member against said center tube and to thereby hold said center tube in communication with said filter attachment means;
a tubular combustible filter element replaceably receivable on said center tube, the filter element having a bottom end and a top end;
top and bottom toroidal end caps sealably closing said filter element top and bottom ends, said bottom end cap sealably engaging said filter attachment means providing closed communication between said tubular filter element and said filter attachment means fluid passageway;
a yoke member having a central opening therethrough receiving said rod and having an outer peripheral area sealably engaging said top end cap; and
nut means threadably received on said rod adjacent to said top end thereof to retain said yoke whereby by removing said nut means and thereby said yoke member said filter element is replaceable without disturbing said center tube.

2. An improved filter according to claim 1 wherein said filter element is comprised of a tubular filter media formed of a pleated member.

3. An improved filter according to claim 1 wherein said elongated apertured center tube is comprised of a plurality of tubular sections joined concentrically end-to-end.

4. An improved filter according to claim 1 wherein said elongated apertured center tube comprises an upper center tubular section having upper and lower ends, a lower center tubular section having upper and lower ends, an intermediate connecting member having upper and lower ends and having a central hub portion with an opening therethrough receiving said rod and having a circumferential flange portion telescopically receiving the upper and lower tubular sections and having integral spoke portions interconnecting said hub and circumferential flange portions.

5. An improved filter according to claim 4 wherein each end of both said upper and lower center tubular sections is of increased internal diameter and wherein said top flange member has a lower end of decreased external diameter, said bottom flange member has an upper end of decreased external diameter and said intermediate connecting member has upper and lower end portions each of decreased external diameter whereby the upper end of said upper center tubular section telescopically receives the lower end of said top flange member and the lower end of said upper center tubular section telescopically receives the upper end of said intermediate connecting member and whereby the upper end of said lower center tubular section telescopically receives the lower end of said intermediate connecting member, the lower end of said lower center tubular section telescopically receives the upper end of said bottom flange member.

6. An improved filter according to claim 1 wherein the top flange member is provided with pressure relief openings therethrough.

* * * * *